(12) United States Patent
Belitz

(10) Patent No.: US 10,030,826 B2
(45) Date of Patent: Jul. 24, 2018

(54) LIGHT BEACON LENS

(71) Applicant: Federal Signal Corporation, Oak Brook, IL (US)

(72) Inventor: Duane P. Belitz, Frankfort, IL (US)

(73) Assignee: Federal Signal Corporation, Oak Brook, IL (US)

( * ) Notice: Subject to any disclaimer, the term of this patent is extended or adjusted under 35 U.S.C. 154(b) by 38 days.

(21) Appl. No.: 15/381,693

(22) Filed: Dec. 16, 2016

(65) Prior Publication Data

US 2017/0184257 A1    Jun. 29, 2017

Related U.S. Application Data

(60) Provisional application No. 62/271,437, filed on Dec. 28, 2015.

(51) Int. Cl.
| | |
|---|---|
| F21K 9/69 | (2016.01) |
| F21K 9/90 | (2016.01) |
| F21V 5/02 | (2006.01) |
| F21V 5/04 | (2006.01) |
| F21Y 115/10 | (2016.01) |
| F21V 31/00 | (2006.01) |
| F21W 111/00 | (2006.01) |

(52) U.S. Cl.
CPC ............... *F21K 9/69* (2016.08); *F21K 9/90* (2013.01); *F21V 5/02* (2013.01); *F21V 5/043* (2013.01); *F21V 5/045* (2013.01); *F21V 31/005* (2013.01); *F21W 2111/00* (2013.01); *F21Y 2115/10* (2016.08)

(58) Field of Classification Search
CPC ..... F21K 9/69; F21K 9/90; F21V 5/02; F21V 5/043; F21V 5/045
See application file for complete search history.

(56) References Cited

U.S. PATENT DOCUMENTS

| | | | |
|---|---|---|---|
| 3,875,561 A | 4/1975 | Scarpino et al. | |
| 5,664,863 A | 9/1997 | Cassarly et al. | |
| 6,481,873 B1 | 11/2002 | Smith | |
| 6,667,582 B1 * | 12/2003 | Procter | B63B 45/04 |
| | | | 313/113 |
| 6,678,097 B2 | 1/2004 | McKenney | |
| 8,177,597 B2 * | 5/2012 | Kolb | F21V 5/046 |
| | | | 362/327 |
| 8,215,802 B2 | 7/2012 | Bailey | |
| 8,360,615 B2 | 1/2013 | Rizkin et al. | |
| 8,628,219 B2 | 1/2014 | Peck et al. | |
| 8,662,702 B2 | 3/2014 | Datz et al. | |
| 8,998,443 B1 | 4/2015 | Shumate et al. | |

(Continued)

*Primary Examiner* — Anne Hines
(74) *Attorney, Agent, or Firm* — Merchant & Gould P.C.

(57) ABSTRACT

An example beacon can include: a dome having an interior space; a prism positioned within the interior space, the prism having a first refraction portion and a second refraction portion, the first refraction portion extending for a first semicircle and the second refraction portion extending for a second semicircle; and a printed circuit board assembly supporting at least one light emitting diode, the printed circuit board assembly being positioned within the interior space of the dome. Light from the at least one light emitting diode is directed by the first refraction portion and the second refraction portion towards an obtuse angle relative to a position of the at least one light emitting diode.

20 Claims, 9 Drawing Sheets

(56) References Cited

U.S. PATENT DOCUMENTS

| | | | | |
|---|---|---|---|---|
| 9,016,896 B1* | 4/2015 | Roudeski | ............... | F21V 7/04 |
| | | | | 362/235 |
| 9,881,466 B2* | 1/2018 | Zarnowski | ............. | F21V 29/70 |
| 2015/0098221 A1* | 4/2015 | Di Giovine | ............. | F21V 5/04 |
| | | | | 362/237 |

* cited by examiner

LIGHT BEACON LENS

BACKGROUND

Light beacons are generally used in a flashing or continuous manner and are typically placed on large vehicles or buildings to notify others of the size and/or presence of such objects.

SUMMARY

Embodiments of the present disclosure are directed to a light beacon. In one aspect, a light beacon includes a dome, a base portion, and a printed circuit board assembly. The dome has a substantially cylindrical outer surface, an inner surface, and defines an interior space. At least a portion of the outer surface is a Fresnel lens. An array of prisms is positioned adjacent to the inner surface, where the array of prisms has a substantially circular cross section with two semicircular portions, and the semicircular portions are mirror images. A half of each semicircular portion includes a first refraction design and a second refraction design, the first refraction design extending from 0° to 40° and the second refraction design extending from 40° to about 90°. The base portion has a planar top surface defining a receiving slot. The printed circuit board assembly supports at least two light emitting diodes, where the printed circuit board assembly passes through the receiving slot and is positioned within the interior space of the dome.

The details of one or more embodiments are set forth in the accompanying drawings and the description below. Other features, objects, and advantages of these embodiments will be apparent from the description, drawings, and claims. Moreover, it is to be understood that both the foregoing summary of the disclosure and the following detailed description are exemplary and intended to provide further explanation without limiting the scope of the disclosure as claimed.

DESCRIPTION OF THE DRAWINGS

The following drawing figures, which form a part of this application, are illustrative of described technology and are not meant to limit the scope of the disclosure as claimed in any manner, which scope shall be based on the claims appended hereto.

DETAILED DESCRIPTION

Figure 1:
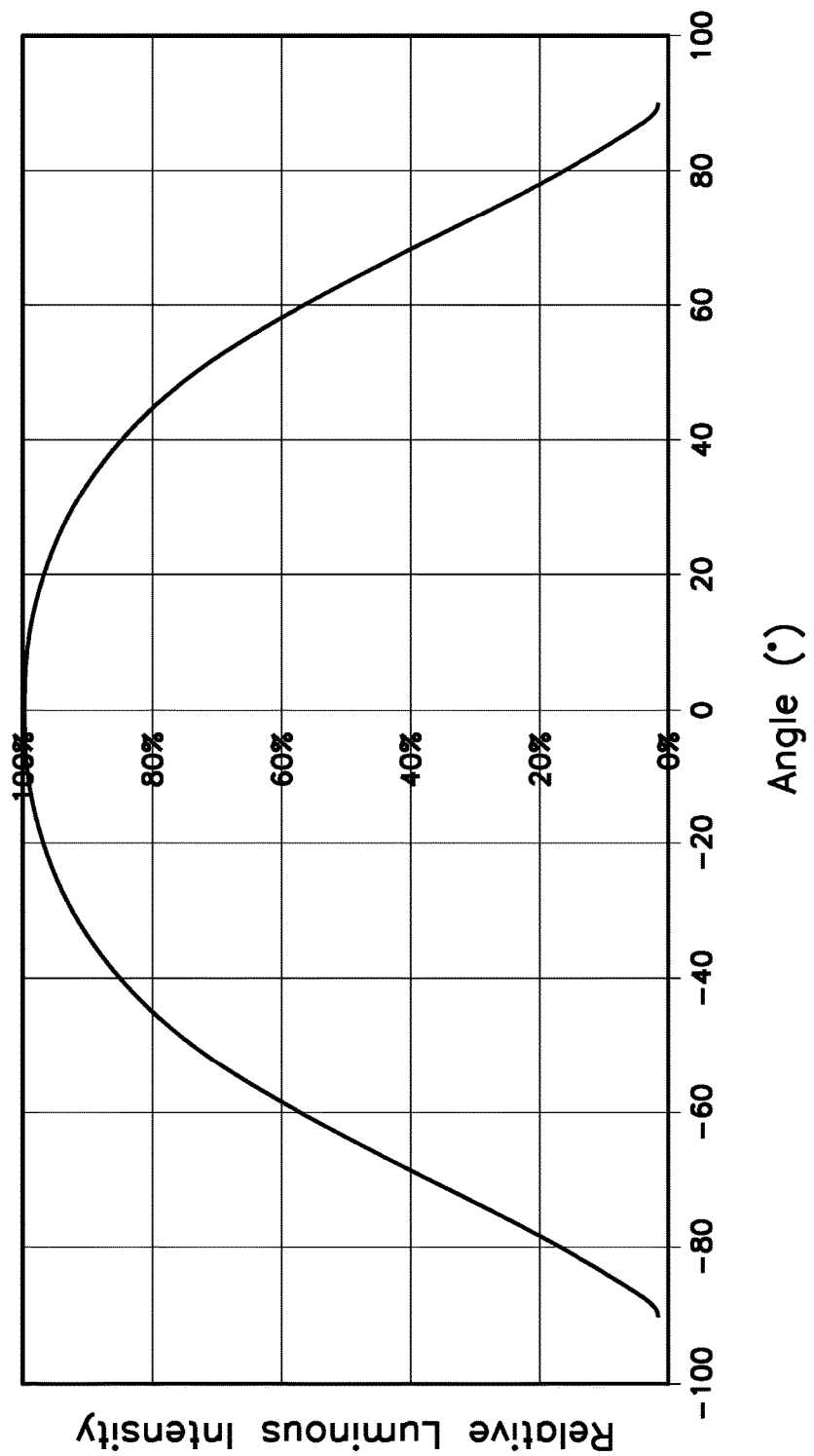
FIG. 1 is a graph of relative intensity (percentage) versus angular displacement (degrees) for an LED.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Light beacons typically include xenon flash tubes to generate a high intensity, short duration light output. Cylindrical Fresnel lenses have traditionally been used in connection with to direct light from the xenon flash tube (typically centrally located within the light beacon) outwardly around a 360 degree axis. Generally, these lenses include a large number of light surfaces along the rounded side surface, each aligned at different angles to refract light outwardly through a lens from a generally central expected light source location.

Increasingly, light emitting diode (LED) technology has been implemented to take the place of xenon flash tubes, due to the economical, low power nature of LEDs. However, when LEDs are used, they must still remain in a generally central location within such a light beacon. Furthermore, due to the generally high light output levels required by a beacon (i.e., for high visibility), it is often the case that multiple LEDs would be required for use. The higher the output level required, the more difficult it is to locate the increased number of, or size of LED emitters in the central region of the beacon, such that light is output from a location analogous to the traditional xenon light source and allowing the Fresnel lenses to remain effective.

Such approaches have drawbacks. For example, use of multiple LEDs in a small, enclosed space results in heat generation, which must be accounted for. Furthermore, it can be difficult to locate a sufficient number of LEDs such that light is output along a 360 degree axis surrounding the beacon. In current approaches, these challenges are generally addressed by positioning LEDs on a small, cylindrical, central heatsink assembly. This is usually done by placing the LEDs on a small daughterboard, with the light signal controls being placed on a separate main board within the beacon housing, to handle the required control electronics. With this arrangement, there are often several pieces to assemble using screws and wire harnesses. Use of such screws and wiring harnesses between circuit boards leads to possible error, for example by vibration or stress on the beacon assembly causing disconnection of the circuit boards. Accordingly, improvements in assembly of such LED-based light beacons are desired.

FIG. 1 illustrates an example relative luminous intensity from a typical high output LED, in this case a Cree® XLamp® XM-L LED (Cree, Inc. UL®, Durham, N.C.). The graph in FIG. 1 demonstrates that the LED's output intensity is highest at an angle of 0° and decreases until the lowest output intensity at −90° and 90°. For instance, the relative luminous intensity at 0° is 100%, at 20° is about 96%, at 40° is about 84%, at 60° is about 58%, at 80° is about 18%, and at 90° is about 0-2%. The light output characteristics shown in FIG. 1 are independent of color.

FIGS. 2-10 illustrate an embodiment of an example light beacon 10, which includes a housing 12 formed from a base 14, a lens 16, and a printed circuit board (PCB) assembly 70. Other embodiments can include more or fewer components.

The example light beacon 10 provides 360°, or nearly 360°, of illumination through the use of just two LEDs. As mentioned above, LEDs typically output only 120°, thus the example light beacon 10 is configured to expand the amount of light emitted from the two LEDs from 240° coverage to 360° coverage. Additionally, the LEDs are supported by a single printed circuit board assembly, which simplifies manufacturing and assembly and reduces the expense of manufacturing the example light beacon 10.

Figure 2:
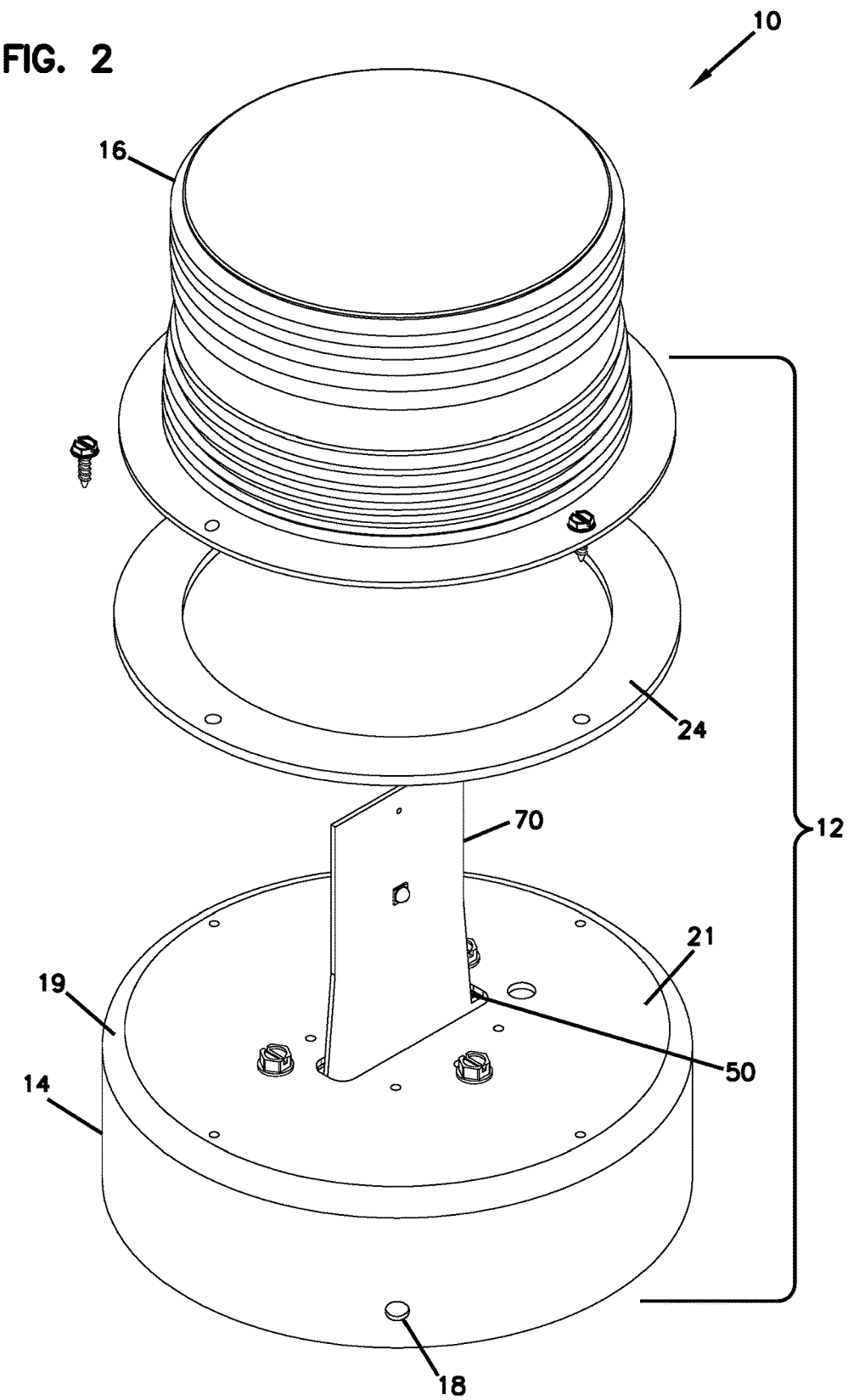
FIG. 2 is a top perspective, exploded view of an embodiment of an example light beacon.
Figure 3:
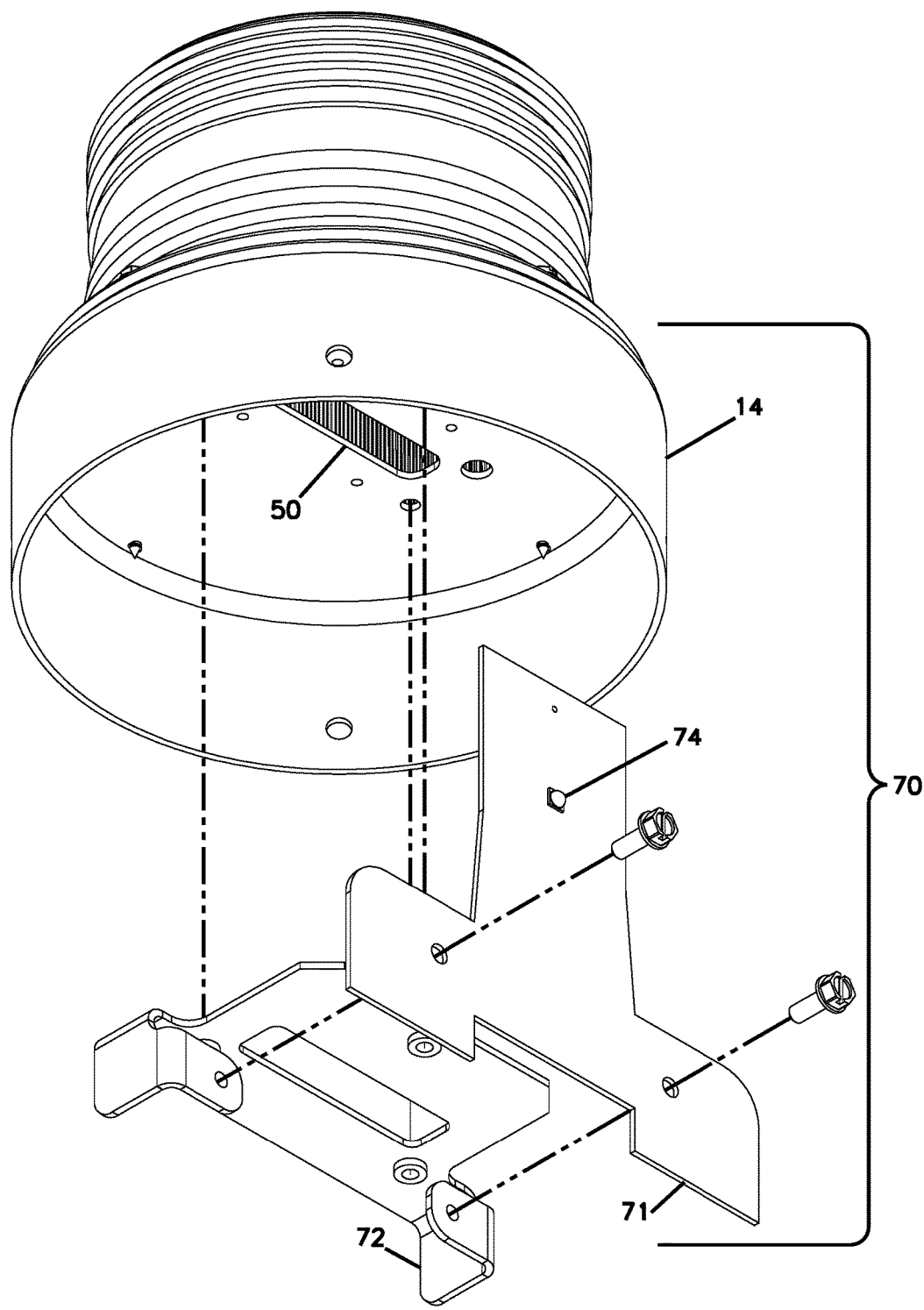
FIG. 3 is a bottom perspective, partially-exploded view of the example light beacon shown in FIG. 2.
Figure 4:
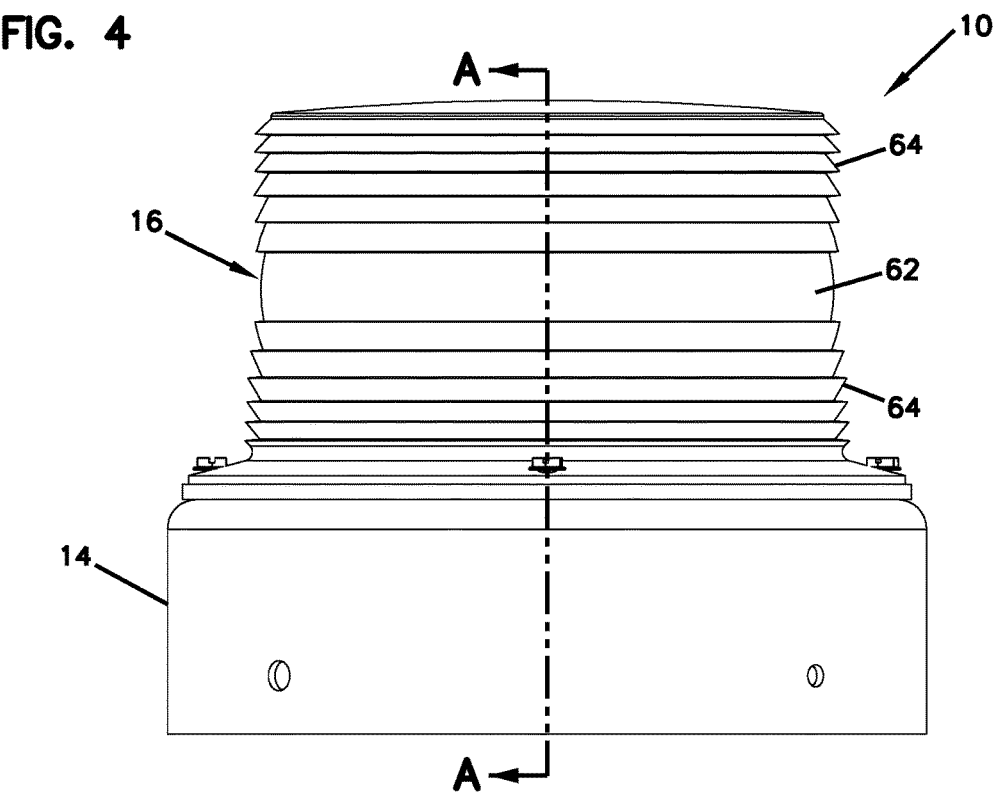
FIG. 4 is a side plan view of the example light beacon shown in FIG. 2.
Figure 5:
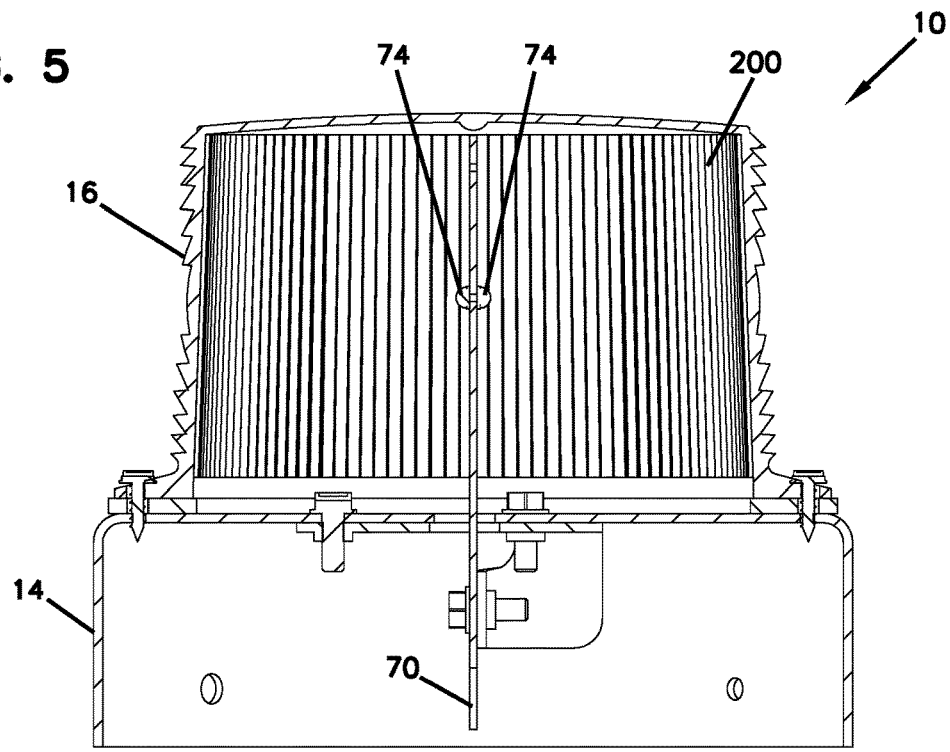
FIG. 5 is a side cross-sectional view of the example light beacon shown in FIG. 2, along the axis A shown in FIG. 4.
Figure 6:
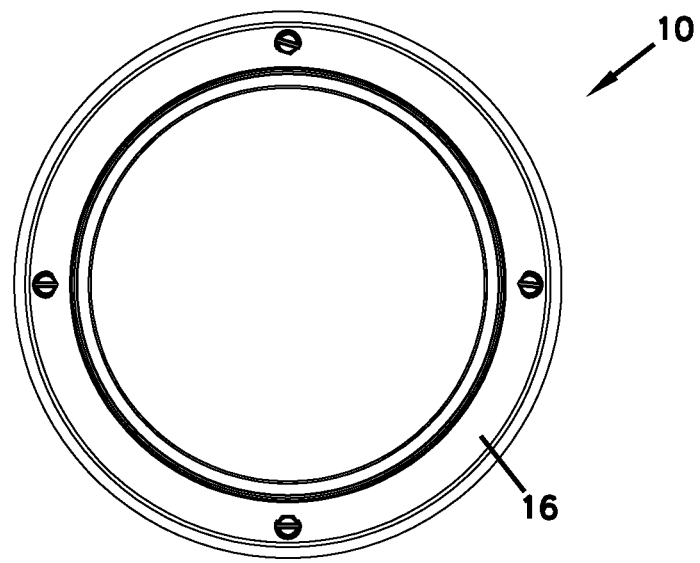
FIG. 6 is a top view of the example light beacon shown in FIG. 2.
Figure 7:
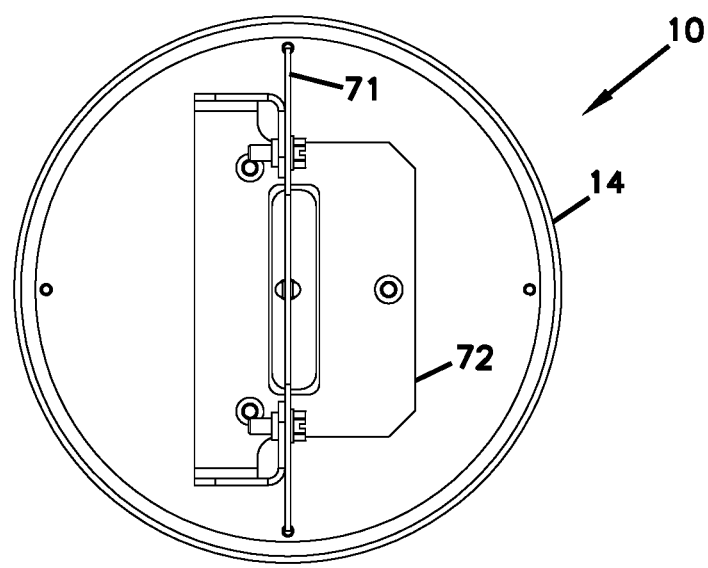
FIG. 7 is a bottom plan view of the example light beacon shown in FIG. 2.

FIG. 2 is a top perspective, exploded view of the example light beacon 10. FIG. 3 is a bottom perspective, partially-exploded view of the example light beacon 10. FIG. 4 is a side plan view of the example light beacon 10. FIG. 5 is a side cross-sectional view of the example light beacon 10 along the axis A shown in FIG. 4. FIG. 6 is a top view of the example light beacon 10. FIG. 7 is a bottom plan view of the example light beacon 10.

The housing 12 has a generally cylindrical shape, when the base 14 and lens 16 are mounted together. The housing 12 is generally configured to be mounted to a vehicle or other installation capable of providing a power signal to the light beacon 10, and which requires use of such a light beacon at a particular location (i.e., as a high-visibility, typically flashing, signal, notifying of the presence of the vehicle or installation to other individuals).

The base 14 has a generally round cross-sectional shape and substantially planar top surface 21. The base 14 includes a plurality of mounting locations 18 adjacent to a flange 19 extending radially from the base. The mounting locations 18 provide locations at which screws or bolts can be used to mount the light beacon to a desired location.

The lens 16 is configured to disperse light generated within an interior of the light beacon at a plurality of directions to ensure high visibility of the light beacon. In the example embodiment shown, the lens 16 is formed by a dome with a Fresnel lens on the exterior surface and a refractive array of prisms positioned adjacent to the interior surface of the dome, as shown and described below with reference to FIGS. 5, 8 and 9.

As illustrated in FIGS. 2-5 and 8, the base 14 and lens 16 cooperate to form the housing 12. As shown in FIG. 2, a gasket 24, shown as an O-ring, can be positioned between the base 14 and lens 16 to assist in forming an environmental seal protecting the interior of the housing 12.

In the embodiment shown, the PCB assembly 70 is positioned within the interior of the lens 16 by passing through an opening 50 in the base 14. PCB assembly 70 is secured to the base 14 using fasteners such as screws, bolts, and rivets. One or more power signal cables can be received within the light beacon 10 through the base 14 and connecting to the PCB assembly 70.

Referring now to FIGS. 3 and 5, PCB assembly 70 is formed by connecting a circuit board 71 and a mount 72. In other embodiments, circuit board 71 and mount 72 are a single, integral piece. The circuit board 71 is connected to the mount 72 and the mount 72 is connected to the base 14.

Two LEDs 74 are supported by the circuit board 71. The LEDs 74 are positioned end-to-end and oriented such that each emits light in opposite directions. The 0° axis (see FIG. 1) of each LED 74 is at least parallel to the 0° axis of the other LED. In embodiments, and as shown, the 0° axis of each LED 74 are collinear. The LEDs 74 are oriented perpendicular to the planar surface of the circuit board 71. Additionally, as shown, the LEDs 74 are aligned on the PCB assembly 70 such that they lie on, or adjacent to, the central axis of the base 14.

As shown, the lens 16 is generally cylindrical in shape, and is translucent, allowing light from the LEDs 74 within the interior to pass through the lens as diffracted by a plurality of lens surfaces. In particular, the lens 16 has an inner surface and an outer surface 62. In the embodiment shown, the outer surface 62 of lens 16 is a Fresnel lens, and includes a plurality of ridged lens surfaces 64 generally disposed horizontally around the circumference of the lens 16 and on the outer surface 60 of the lens. The ridged lens surfaces 64 are configured to diffract light from the LEDs 74 outwardly and at various vertical orientations.

As shown in FIG. 5, the surface of PCB assembly 70 is perpendicular to the planar top surface 21 of base 14. Thereby, the direction of the LEDs' best output, at 0°, is oriented to be parallel to the planar top surface 21 of base 14. Also shown in FIG. 5 is refractive array of prisms 200, discussed below.

Figure 8:
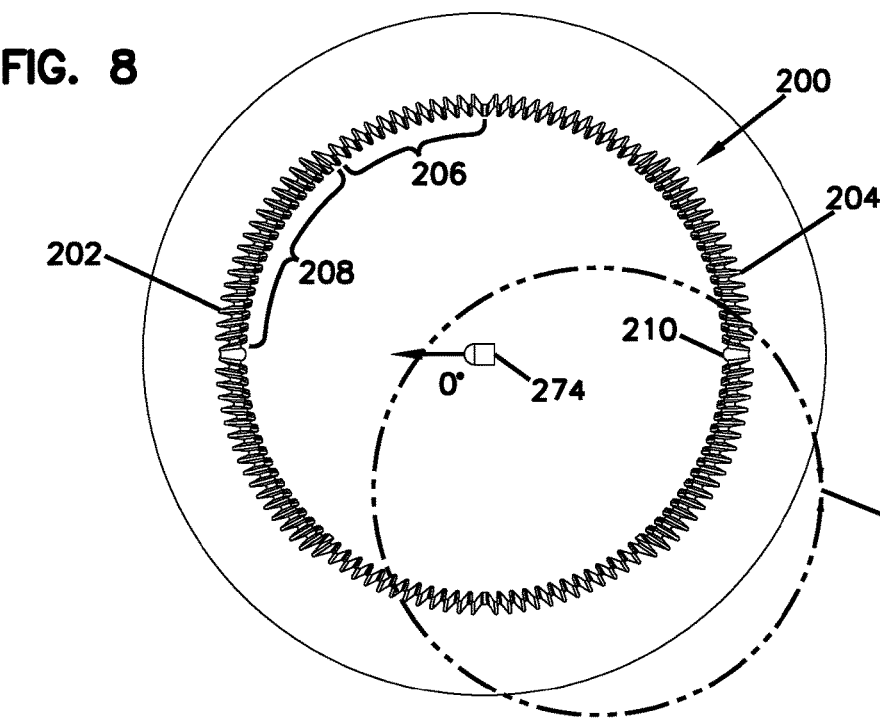
FIG. 8 is a cross-sectional view of an embodiment of an example refractive prism array positioned in the interior of the example light beacon shown in FIG. 2.
Figure 9:
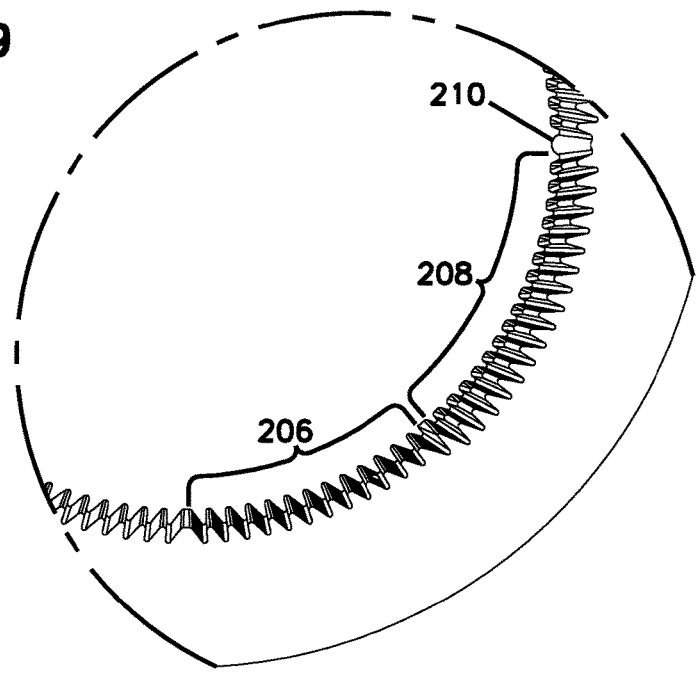
FIG. 9 is a close-up view of a portion of FIG. 8.

FIG. 8 is a cross-sectional top view illustrating an embodiment of an example refractive array of prisms 200. FIG. 9 illustrates a close-up view of a portion of the cross section of refractive array of prisms 200 shown in FIG. 8. The refractive array of prisms 200 is positioned adjacent to the inner surface of lens 16. In embodiments, the refractive array of prisms 200 extends at least a portion of the overall vertical height of the lens 16; more than half of the overall vertical height of the lens 16; or vertically along the entire height of the lens 16.

Figure 10:
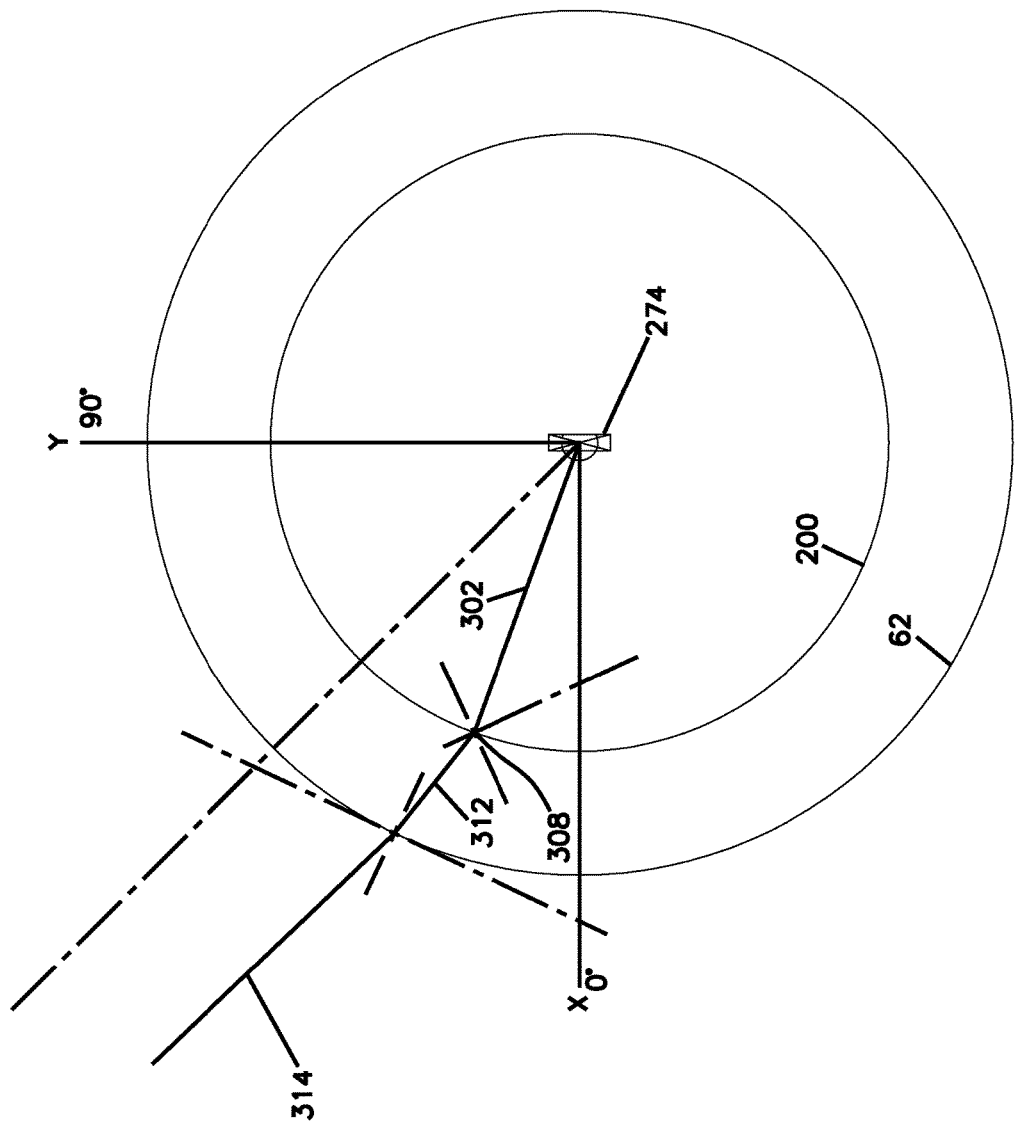
FIG. 10 is a schematic illustration of the path of a light ray emitted by a light emitting diode used in the example light beacon shown in FIG. 2.

FIG. 8 also includes an exemplary LED 274 positioned at or near the center of the refractive array of prisms 200 solely to show the axis of strongest light emission relative to the refractive array of prisms 200 configuration. A second LED would be positioned to project light with the strongest axis parallel to, or collinear with, the axis shown in FIG. 8. Moreover, FIGS. 8-10 are not intended to illustrate the positioning of the PCB assembly within the refractive prism array or to indicate the number of LEDs used within the light beacon.

As discussed with reference to FIG. 1 above, LEDs generally emit light in a cone with a spread of 120°, or put another way, a spread of 60° on each side of the 0° axis. The refractive array of prisms 200 spreads the light emitted by the LED towards a direction of the LED's lowest performance. In the embodiment shown, light from the LED is turned (see FIG. 10 for an example) to be about 10° to about 80°. As seen in FIG. 5, lens 16 directs light by a combination of the refractive array of prisms 200, located adjacent to the inner surface of the dome, and the Fresnel lens, located on the exterior surface of the dome. Thus, light from the LED is first refracted by the refractive array of prisms 200 and again refracted when passing through the dome. An example of the lens 16 refraction is shown and described in more detail below with reference to FIG. 10.

The example refractive array of prisms 200 includes an upper semicircle portion 202 and a lower semicircle portion 204 adjoined at ends 210. Upper semicircle portion 202 and lower semicircle portion 204 are mirror images. Further, each semicircle portion 202, 204, comprises two mirror image halves.

Generally, between 0° and 40° the semicircle portion 202 or 204 has a first refractive portion 206, and between 40° and 90° the semicircle portion 202 or 204 has a second refractive portion 208. In other embodiments, the first and second refractive designs extends between other degree ranges, for example, the first refractive portion 206 extends from 0° to 45° and the second refractive portion 208 extends from 45° to 90°; or the first refractive portion 206 extends from 0° to 30° and the second refractive portion 208 extends from 30° to 90°.

Each refractive portion 206 and 208 is configured to receive light from the LED and direct it towards the 90° direction. In the embodiment shown, the second refractive portion 208 is configured to turn the light outwardly more than the first refractive portion 206.

As noted above, the example refractive array of prisms 200 includes a plurality of spreading elements that turn the light from the LED 274 toward the extreme 90° direction. For example, the spreader located at 45° off the LED 274 turns the light to 60°; at 20° turns the light to 35°; at 25° turns the light to 40°, and so on. Traditional rounded-flute spreaders have a continuously curved cross section, which means there is only one point at a given angle. This limits the amount of light energy that can be directed at a given angle. In contrast, the spreaders in example refractive array of prisms 200 each are substantially planar in a given orientation, which means a greater amount of energy can be redirected in the desired direction.

As shown in FIG. 9, the example refractive array of prisms 200 has a spreader stepped every 3° to 5°. Thus, each spreader intercepts a different section of light emitted by the LED 274. Section 206 includes a plurality of spreaders that receive the higher intensity output of the LED. Section 208 includes a plurality of spreaders with slightly differing prism angles. Because there is less energy emitted by the LED 274 in this region, each angle is adjusted individually to increase efficiency.

FIG. 10 is a schematic diagram illustrating an example path of light 302 emitted from LED 274. Axis X is the direction of the LED's 274 best light output and axis Y is the direction of the LED's 274 worst light output. The light rays emitted by LED 274 pass through the refractive spreader 200 and through the material of the dome. Other light paths are possible than the path shown in FIG. 10.

Light 302 is emitted at an initial angle from LED 274 and contacts the refractive spreader 200 at point 308. Under Snell's law, the light 302 is refracted and continues away from the LED 274 at a new angle, shown as portion 312. Then the light portion 312 contacts the outer surface 62 of lens 16, and is again redirected at a second new angle, shown as portion 314.

Thus, FIG. 10 illustrates that light emitted by the LED is turned towards the direction of the LED's worst performance (y-axis) by the refractive array of prisms 200 and Fresnel lens 62.

As the distance to the outer surface increases from the focal center of the LED 274, the light rays from the LED interface with the dome to the air at a sharper angle relative to the tangent line of the exterior curvature at that point. Because the dome is a Fresnel lens, the surface thickness changes with vertical height as well as the exit angle from the LED 274. Thus, the light paths vary from the same exit angle relative to the vertical height position, which is not shown in FIG. 10.

Figure 11:
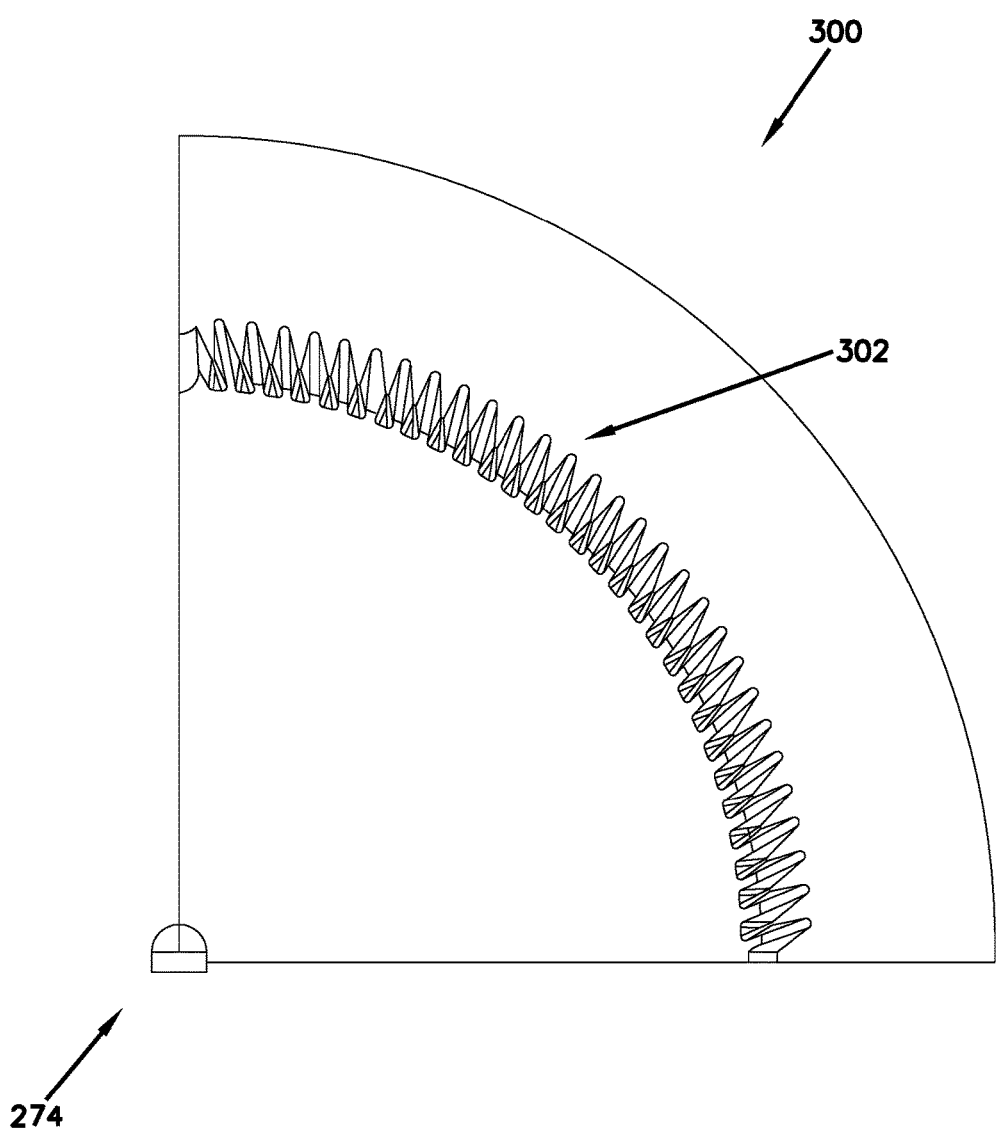
FIG. 11 is a top plan view of a portion of an alternate embodiment of an example refractive prism array that can be positioned in the interior of the example light beacon shown in FIG. 2.
Figure 12:
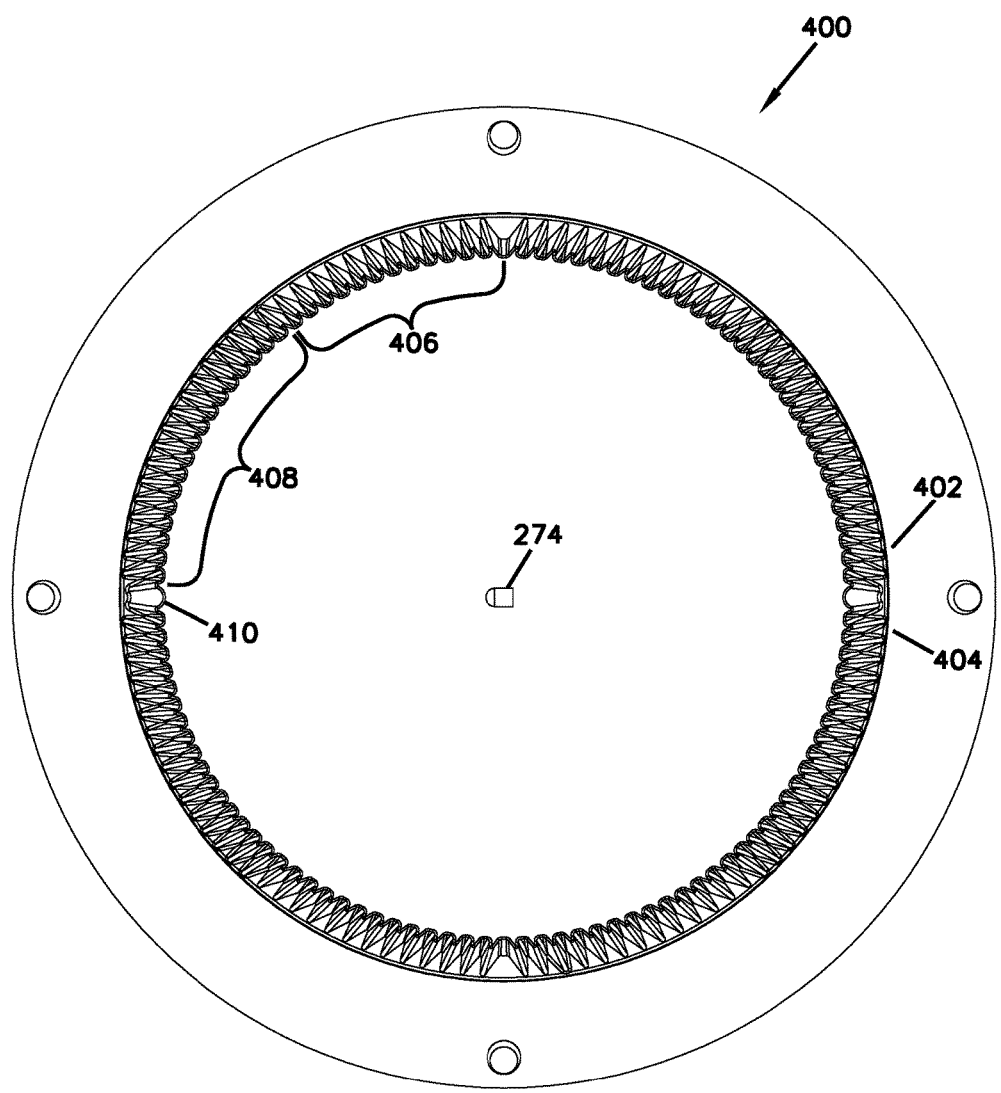
FIG. 12 is a top plan view of a second alternate embodiment of an example refractive prism array that can be positioned in the interior of the example light beacon shown in FIG. 2.

FIG. 11 illustrates a top plan view of an alternative embodiment of a refractive array of prisms 300. Only one quarter of the refractive array of prisms 300 is shown, portion 302. The complete array of prisms would have mirror images of the portion 302 in the other three quadrants. FIG. 12 includes an exemplary LED 274 positioned at or near the center of the refractive array of prisms 400. In contrast to the example refractive array of prisms 200 shown and described with reference to FIGS. 8-9, this embodiment of a refractive array of prisms 300 has a uniform portion 302 in each quadrant.

FIG. 12 illustrates a second alternate embodiment of an example refractive array of prisms 400 that can be positioned within the interior of the example light beacon 10. FIG. 12 includes an exemplary LED 274 positioned at or near the center of the refractive array of prisms 400. The example refractive array of prisms 400 includes an upper semicircle portion 402 and a lower semicircle portion 404 adjoined at ends. Upper semicircle portion 402 and lower semicircle portion 404 are mirror images. Further, each semicircle portion 402, 404, comprises two mirror image halves.

The example refractive array of prisms 400 includes a first refractive portion 406 and a second refractive portion 408. The first refractive portion 406 includes spreaders angled at 35° relative to the incident ray from the LED. The spreaders in the first refractive portion 406 generally direct the light rays toward about 84°. Each spreader is rotated about 3.1° to direct light to the next step degree. As shown, there are thirteen spreaders in the first refractive portion 406. Further, the rays that pass 90° after contacting the first refractive portion 406 enhance the lit appearance of the opposite side. The first refractive portion 406 covers about 37° of each 90° portion in the example refractive array of prisms 400.

The second refractive portion 408 covers about 46° of each 90° portion in the example refractive array of prisms 400. The spreaders in the second refractive portion 408 are angled at about 27.5° relative to the incident light rays emitted by the LED. These spreaders direct light towards about 45°. Each successive spreader in the second refractive portion 408 is rotated about 2.9° to direct light further towards the 90° direction. As shown, there are 17 spreaders in the second refractive portion 408.

Two traditional fluted spreaders 410 are positioned between the upper semicircle portion 402 and lower semicircle portion 404. These spreaders 410 are intended to reduce the maximum intensity directly in line with the LED. The spreaders 410 cover about 7° of each 90° section.

Referring to FIGS. 1-12 overall, it is noted that although in the embodiments discussed herein the beacon is configured to be generally cylindrical, other shapes would be possible as well. Furthermore, the beacon can be considered generally cylindrical based on the shape of the lens alone, since the base can be of varying sizes or shapes to accommodate mounting of the beacon to a variety of different types and sizes of surfaces.

The description and illustration of one or more embodiments provided in this application are not intended to limit or restrict the scope of the inventions as claimed in any way. The embodiments, examples, and details provided in this application are considered sufficient to convey possession and enable others to make and use the best mode of claimed inventions. The claimed inventions should not be construed as being limited to any embodiment, example, or detail provided in this application. Regardless whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed inventions and the general inventive concept embodied in this application that do not depart from the broader scope.

What is claimed is:

1. A light emitting diode beacon, comprising:
   a dome defining an interior space;
   a prism positioned within the interior space, the prism having a first refraction portion and a second refraction portion, the first refraction portion extending for a first semicircle and the second refraction portion extending for a second semicircle; and
   a printed circuit board assembly supporting at least one light emitting diode, the printed circuit board assembly being positioned within the interior space of the dome;
   wherein light from the at least one light emitting diode is directed by the first refraction portion and the second refraction portion towards an obtuse angle relative to a position of the at least one light emitting diode.

2. The light emitting diode beacon of claim 1, wherein the dome has a cylindrical outer surface.

3. The light emitting diode beacon of claim 2, wherein at least a portion of the cylindrical outer surface is a Fresnel lens.

4. The light emitting diode beacon of claim 1, wherein the first refraction portion and the second refraction portion of the prism are mirror images.

5. The light emitting diode beacon of claim 1, further comprising a base portion having a planar top surface, the planar top surface defining a receiving slot.

6. The light emitting diode beacon of claim 5, wherein the printed circuit board assembly passes through the receiving slot.

7. The light emitting diode beacon of claim 1, wherein the first refraction portion extends from 0° to 40° and the second refraction portion extends from 40° to about 90°.

8. A light beacon, comprising:
   a dome having a substantially cylindrical outer surface, an inner surface, and defining an interior space,
      wherein at least a portion of the substantially cylindrical outer surface is a Fresnel lens;
      wherein a prism is positioned adjacent to the inner surface, the prism having a substantially circular cross section with two semicircular portions, the two semicircular portions being mirror images; and
      wherein a half of each semicircular portion includes a first refraction design and a second refraction design, the first refraction design extending from 0° to 40° and the second refraction design extending from 40° to about 90°;
   a base portion having a planar top surface, the planar top surface defining a receiving slot; and
   a printed circuit board assembly supporting at least two light emitting diodes, wherein the printed circuit board assembly passes through the receiving slot and is positioned within the interior space of the dome.

9. The light beacon of claim 8, wherein the light beacon provides 360° of illumination.

10. The light beacon of claim 8, wherein the light beacon is round.

11. The light beacon of claim 8, wherein the at least two light emitting diodes are first and second light emitting diodes, with the first light emitting diode being positioned on a first side of the printed circuit board assembly, and with the second light emitting diode being positioned on an opposite second side of the printed circuit board assembly.

12. The light beacon of claim 8, wherein each of the first refraction design and the second refraction design includes spreading elements that turn light from the at least two light emitting diodes towards an extreme 90° direction.

13. The light beacon of claim 12, wherein adjacent spreading elements of the spreading elements are substantially planar.

14. The light beacon of claim 13, wherein a spreading element of the spreading elements is positioned every 3° to 5°.

15. A method of assembling a light emitting diode beacon, the method comprising:
   positioning a prism within an interior space of a dome, the prism having a first refraction portion and a second refraction portion, the first refraction portion extending for a first semicircle and the second refraction portion extending for a second semicircle; and
   coupling two light emitting diodes on a printed circuit board assembly;
   positioning the printed circuit board assembly within the interior space of the dome; and
   allowing light from at least one of the two light emitting diodes to be directed by the first refraction portion and the second refraction portion towards an obtuse angle.

16. The method of claim 15, further comprising forming the dome to have a substantially cylindrical outer surface.

17. The method of claim 16, further comprising forming the substantially cylindrical outer surface to include a Fresnel lens.

18. The method of claim 15, further comprising forming the first refraction portion and the second refraction portion as mirror images.

19. The method of claim 15, further comprising:
   coupling a base portion to the dome, the base portion having a planar top surface, the planar top surface defining a receiving slot; and
   positioning the printed circuit board assembly through the receiving slot.

20. The method of claim 15, wherein the first refraction portion extends from 0° to 40° and the second refraction portion extends from 40° to about 90°.

* * * * *